UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

RED-HALOGEN VAT-DYE AND PROCESS OF MAKING SAME.

No. 848,355. Specification of Letters Patent. Patented March 26, 1907.

Application filed January 9, 1907. Serial No. 351,443.

*To all whom it may concern:*

Be it known that I, GADIENT ENGI, chemist and doctor of philosophy, citizen of the Swiss Republic, and a resident of Basel, Switzerland, have invented new and useful halogenated red vat-dyeing dyestuffs and a process for the manufacture of the same, of which the following is a full, clear, and exact description.

In my application for United States Letters Patent, Serial No. 316,309, filed May 11, 1906, I have described the manufacture of a red vat-dyeing dyestuff by condensing salicylthioacetic acid with isatin. Since I have found that this dyestuff can be transformed into new exceedingly valuable products by introducing a halogen into its molecule. The thus-resulting halogen derivatives possess relatively to the dyestuff employed as parent material the advantage of a greater affinity to unmordanted cotton, and consequently of a greater fastness to washing. The introduction of halogens into the molecule of the said dyestuff takes place by treating this latter with halogens or with substances able to deliver up halogens, as chlorin, bromin, antimony pentachlorid, sulfuryl chlorid, in the presence of indifferent solvents or diluents as nitrobenzene, glacial acetic acid, &c.

The invention is illustrated by the following examples:

Example I: Twenty parts, by weight, of the condensation product of salicylthioacetic acid and isatin are finely crushed or ground and suspended in four hundred parts of nitrobenzene. To this suspension thirty-five to forty parts of bromin are added, and the mixture is heated, in the course of about one hour, in a reflux apparatus gradually to a gentle ebullition, whereby great quantities of hydrobromic acid escape. The mass is further maintained in ebullition for about one and one-half hours—viz., until the escapement of hydrobromic acid ceases. The red colored solution is then allowed to cool, and the product of reaction, forming brilliant yellow-red small crystals, is separated by filtration, washed with alcohol, and dried. The new dyestuff dissolves in concentrated sulfuric acid with dirty brown-black coloration. On addition of water to this sulfuric solution of the dyestuff this latter is precipitated in form of scarlet-red flocks. By heating the dyestuff with fuming sulfuric acid a red-violet solution is obtained, which becomes quickly brown-red and gives, on addition of water, a clear bright brown-red solution containing probably a dissolved sulfonic acid of the new dyestuff, the said latter solution dyeing wool bright red tints. In hot alcohol and hot benzene the brominated dyestuff is very difficultly soluble with a rose coloration, but easily in hot nitrobenzene with a deep red coloration. On cooling the dyestuff separates in form of brilliant yellow-red felted needles. When made into a vat with the usual reducing agents, the dyestuff yields a bright yellow vat. When applied by the dyeing and printing processes usually employed for vat-dyeing dyestuffs, the new dyestuff gives on unmordanted cotton red tints of a great intensity and an excellent fastness to washing. If in the foregoing example smaller quantities of bromin—for instance, only thirteen parts of bromin—are employed, the product of reaction, which contains less bromin, has analogous properties.

Example II: In a suspension of four parts, by weight, of the condensation product of one molecule alphaoxythionaphthene (thioindoxyl) or salicylthioacetic acid and one molecule isatin in about forty parts of glacial acetic acid a current of chlorin is led until an increased weight of four parts may be ascertained. The crystalline brownish-red product of reaction is then separated by filtration, washed with alcohol, and dried. The dyestuff thus obtained dissolves in concentrated sulfuric acid with a brown coloration. On adding water to this sulfuric solution brilliant red flocks separate. Fuming sulfuric acid gives a violet-red solution with formation of a sulfonic acid of the dyestuff. On addition of water to this latter solution a clear brown-red solution is obtained, which dyes wool in lively red shades. The dyestuff is difficultly soluble in hot alcohol and hot benzene with a rose coloration; but it is easily soluble in hot nitrobenzene with an intense red coloration. When applied on cotton by dyeing or printing, by means of the known processes, the dyestuff yields red tints which are yellower, purer, and also faster to washing than the tints obtained by the not chlorinated product. In an analogous manner may be obtained the halogenated derivatives of the condensation product of salicyl-thioacetic acid or alphaoxythionaphthene (thioindoxyl) with methylisatin, isatinchlorid, or another isatin compound.

What I claim is—

1. The process for the manufacture of red vat-dyeing dyestuffs by treating with a halogen, in presence of an indifferent diluent, the products resulting from the condensation of one molecule of alphaoxythionaphthene (thioindoxyl) with one molecule of an isatin compound.

2. As new products, the halogenated red vat-dyeing dyestuffs derived from the herein-specified condensation products of alphaoxythionaphthene (thioindoxyl) with isatin compounds, the said dyestuffs constituting in dry state brown-red to yellow-red crystalline powders, difficultly soluble in hot alcohol and in hot benzene, easily soluble in hot nitrobenzene with a red coloration, soluble in concentrated sulfuric acid with brown to dirty brown-black coloration and soluble in fuming sulfuric acid with red-violet coloration becoming clear brown-red on addition of water.

In witness whereof I have hereunto signed my name, this 19th day of December, 1906, in the presence of two subscribing witnesses.

GADIENT ENGI.

Witnesses:
 GEO. GIFFORD,
 AMAND RITTER.